L. McDONALD.
WATER COOLER.
APPLICATION FILED JULY 19, 1915.
1,197,840.
Patented Sept. 12, 1916.
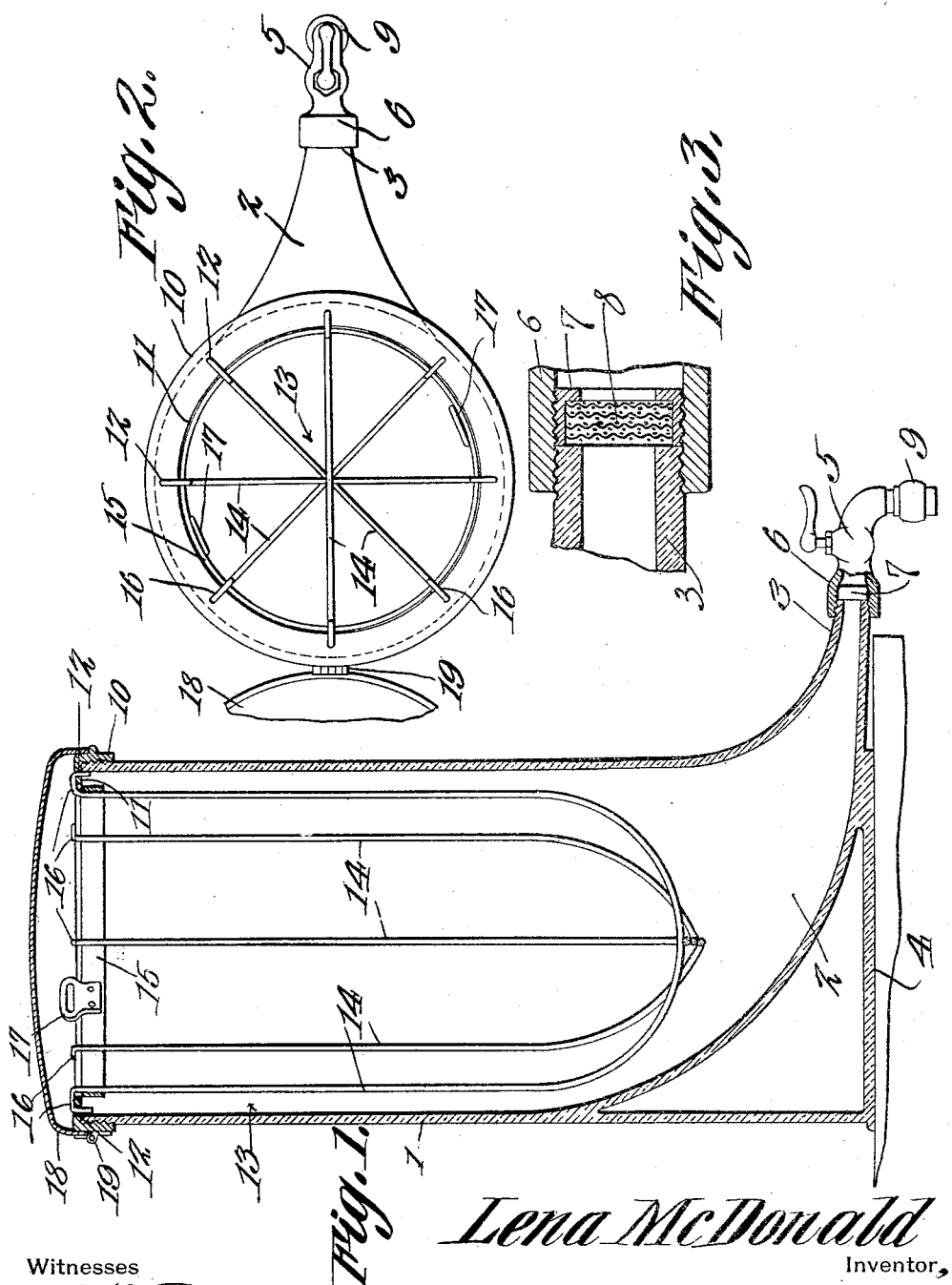
Lena McDonald
Inventor,
by C. A. Snow & Co.
Attorneys.

UNITED STATES PATENT OFFICE.

LENA McDONALD, OF CHADBOURN, NORTH CAROLINA.

WATER-COOLER.

1,197,840.  Specification of Letters Patent.  Patented Sept. 12, 1916.

Application filed July 19, 1915. Serial No. 40,747.

*To all whom it may concern:*

Be it known that I, LENA McDONALD, a citizen of the United States, residing at Chadbourn, in the county of Columbus and State of North Carolina, have invented a new and useful Water-Cooler, of which the following is a specification.

The present invention appertains to water coolers, and aims to provide a novel and improved device of that nature.

It is the object of the invention to provide a water cooler which is perfectly sanitary in use, the same being so constructed that sediment or precipitates cannot lodge therein, and the device having means for catching the sediment and allowing the same to be cleaned out from time to time.

The invention embodies an upright transparent water receptacle or tank whose lower portion is of peculiar formation to the ends above noted, and the receptacle having an ice basket suspended therein for holding the chunks of ice, and for preventing the ice from contacting with the walls of the receptacle, so that the receptacle is not apt to be broken.

It is also within the scope of the invention to provide a water cooler having the characteristics above noted, and which at the same time, is comparatively simple and inexpensive in construction, as well as being hygienic, and practical in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a central vertical section of the improved water cooler. Fig. 2 is a plan view thereof, with the cover swung open and partially broken away. Fig. 3 is an enlarged sectional detail of the spout and strainer.

In carrying out the invention, there is provided an upright cylindrical water receptacle or container 1, constructed of glass or other transparent material. The walls of the receptacle 1 merge into a lower funnel or horn 2 which is turned to one side and which decreases in diameter. The terminal of the funnel 2 provides a laterally projecting spout 3. The receptacle 1 has a flat bottom or base 4 below the funnel 2 and integral therewith, whereby the receptacle may be seated upon a table, shelf or other suitable support, with the spout 3 projecting forwardly or outwardly. The foregoing structure may be readily molded from glass in one piece, to provide a unitary or integral structure, and the lower wall of the funnel 2 provides a curved bottom for the water chamber, whereby any sediment within the water chamber will be directed by gravitation and by the flow of the water into the spout or nozzle 3.

A faucet 5 is provided with a socket portion 6 threaded upon the spout 3, the threads being rounded to prevent the breakage of the glass, and a strainer is disposed within the portion 6 for arresting the sediment and foreign particles that might exist within the water chamber. The strainer embodies a collar 7 removably threaded within the portion 6, the threads being rounded, and screens or straining elements 8 are secured within the collar 7 and are adapted to strain or filter the water discharged from the spout into the faucet 5. It is also preferable to attach a filter 9 to the faucet 5.

A ring or band 10 is threaded upon the upper end of the receptacle 1, and is provided at its upper edge with an inturned annular flange 11 seating upon the upper end of the receptacle and projecting inwardly beyond the walls of the receptacle to overhang the interior thereof or the water chamber. The flange 11 is provided with an annular series of apertures 12.

The flange 11 supports a depending ice basket or cage 13, said basket comprising a plurality of doubled or U-shaped rods 14 having the lower rounded bends seating one upon the other. The rods 14 are arranged at suitable angles relative to one another to provide the walls of the basket, and a ring or hoop 15 is suitably secured to the rods 14 adjacent their upper ends, for completing the basket, and to unite the rods. The upper terminals of the rods 14 are bent back outwardly to provide hooks 16 which engage downwardly through the apertures 12 for suspending the basket within the receptacle. Suitable handles 17 are attached to the ring 15 for allowing the basket to be readily lifted upwardly through the flange 11 of the ring 10, when it is desired to remove the ice basket.

A cover 18 is fitted over the ring 10 to close the receptacle or vessel, and is preferably hinged, as at 19, to the ring 10 whereby the cover may be readily swung open and closed.

The parts of the basket, ring 10 and cover 18 are preferably constructed of such metal that will not rust which would of course be objectionable.

In use, when the cover 18 is swung open, the ice after being properly washed may be readily deposited within the basket 13, by dropping the chunks of ice into the basket, or by elevating the basket so that the ice can be more readily placed thereinto. It is evident that the basket 13 may be readily raised and lowered for purpose of placing the ice within the receptacle, or for purpose of cleaning the basket and interior of the receptacle. The rods or straps 14 being resilient will yield when the chunks of ice are dropped into the basket, to prevent injury to the receptacle 1, and the basket will normally hold the ice spaced from the walls of the receptacle to prevent the breaking of the glass. The water is poured into the receptacle from the top, and the ice in melting will cool the water.

When the faucet 5 is opened, the water within the receptacle will flow downwardly within the funnel 2 and then laterally through the spout 3, whereby a desirable downward flow of the water to the point of outlet is established. Furthermore, by the provision of the funnel 2, any sediment within the receptacle cannot lodge upon the bottom or other portions thereof, but will be directed into the spout 3. The sediment will be caught by the strainer or filter 7, and may be readily cleaned out from time to time, by removing the faucet 5 and collar 7. Since the receptacle and its funnel are transparent, the observer may note the entire body of water within the receptacle, and the ice is also exposed to view, whereby it is possible to observe the purity of the water before drinking. The observer may also look to see whether there is any sediment in the funnel 2 and its spout 3, as well as within the body of the receptacle, which is a salient feature of the invention.

The present cooler may be used in railway coaches and depots, and in fact may be used in offices, residences, and elsewhere where drinking water is necessary. The device can be inexpensively and readily manufactured, and is sanitary and desirable in its use.

Having thus described the invention, what is claimed as new is:

1. A water cooler embodying an upright receptacle, a ring carried by the upper end thereof, and an ice basket suspended within said receptacle and fitting within said ring, said basket embodying doubled members having lower bends disposed one upon the other, and the upper ends of said members having portions engaging said ring.

2. A water cooler comprising an upright receptacle, a ring engaged upon the upper end thereof and having an inturned flange provided with apertures, a cover fitting upon said ring, and an ice basket suspended within the receptacle and disposed within said flange, said basket comprising doubled rods having lower bends disposed one upon the other, and a hoop attached to said rods adjacent their upper ends, the upper ends of the rods having hooks engaged downwardly through said apertures.

In testimony that I claim the foregoing as my own, I have hereto affixed my signature in the presence of two witnesses.

LENA McDONALD.

Witnesses:
V. E. FAULK,
C. R. LEONHART.